United States Patent [19]

Kepley, III et al.

[11] Patent Number: 5,394,467
[45] Date of Patent: Feb. 28, 1995

[54] MULTI-PURPOSE TELEPHONE STRAIN RELIEF

[75] Inventors: Walter R. Kepley, III, Gaithersburg; Dana J. Greer, Frederick, both of Md.; Richard A. Shields, Jr., Bellevue, Wash.

[73] Assignee: Claircom Communications Group, L.P., Seattle, Wash.

[21] Appl. No.: 40,178

[22] Filed: Mar. 26, 1993

[51] Int. Cl.[6] ............................................. H04M 1/00
[52] U.S. Cl. .................................... 379/438; 379/433
[58] Field of Search ............... 379/433, 425, 437, 438, 379/428; 381/91

[56] References Cited

U.S. PATENT DOCUMENTS

| | | | |
|---|---|---|---|
| 2,136,624 | 11/1938 | Kuhn | 379/438 |
| 4,178,490 | 12/1979 | Boenecke | 379/433 |
| 4,845,774 | 7/1989 | Arzounia | 379/433 |
| 5,144,657 | 9/1992 | Depaepe | 379/438 |
| 5,204,907 | 4/1993 | Staple et al. | 381/91 |
| 5,239,578 | 8/1993 | Regen et al. | 379/433 |

FOREIGN PATENT DOCUMENTS 136457  7/1985  Japan .................................. 379/425

*Primary Examiner*—James L. Dwyer
*Assistant Examiner*—Jack Chiang
*Attorney, Agent, or Firm*—Knobbe, Martens, Olson & Bear

[57] ABSTRACT

A one-piece, molded subassembly with a near-field acoustic chamber and a far-field acoustic chamber on either side of a centrally disposed microphone. A slightly-flared passage through the subassembly couples the far-field acoustic chamber to an exterior port in order to provide noise cancellation. A cord passage in the subassembly is directed in three mutually orthogonal directions so that a strain on the cord is not transmitted beyond the subassembly where it initially enters the handset.

4 Claims, 2 Drawing Sheets

5,394,467

MULTI-PURPOSE TELEPHONE STRAIN RELIEF

CROSS REFERENCE TO RELATED APPLICATION

The disclosure of this application is related in subject matter to that of the following U.S. application Ser. No. 08/041,215, filed Mar. 26, 1993, by Jeffrey P. Singer, Walter R. Keply, III, and Steven M. Kee, entitled "Wired Seat Back Aircraft Telephone Set" (Claircom Communications, Inc. Docket No. 213,6) and Ser. No. 08/040,180 filed Mar. 26, 1993, by Walter R. Kepley, III, Dana J. Greer, and Richard A. Shields, Jr., entitled "Credit Card Reader" (Claircom Communications, Inc. Docket No. 213,7) which are assigned to the assignee of this application. The disclosures of these applications are incorporated herein by reference.

DESCRIPTION

BACKGROUND OF THE INVENTION

1. Field of the Invention

This invention relates to telephone handset technology, and more particularly, to a compact, one-piece subassembly that houses the handset microphone, hook switch, and provides a strain relief connection to the telephone cord connected to the handset.

2. Description of the Prior Art

As will be appreciated by those skilled in the art, it is highly desirable to reduce the cost and complexity of a telephone handset, particularly a handset for seat back mounted telephone sets of the type described in the afore-referenced co-pending application.

SUMMARY OF THE INVENTION

An object of this invention is the provision of a single piece, molded, subassembly that is compact, in size, light weight, and serves the following multiple functions: strain relief for the handset cord; microphone support with acoustic chambers, a noise canceling port, and a hook-switch housing.

Briefly, this invention contemplates the provision of a one-piece, molded subassembly with a near-field acoustic chamber and a far-field acoustic chamber on either side of a centrally disposed microphone. A slightly-flared passage through the subassembly couples the far-field acoustic chamber to an exterior port in order to provide noise cancellation. A cord passage in the subassembly is directed in three mutually orthogonal directions so that a strain on the cord is not transmitted beyond the subassembly where it initially enters the handset. The hook switch (a small magnetic reed switch) is housed in a cavity on the side of the subassembly.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
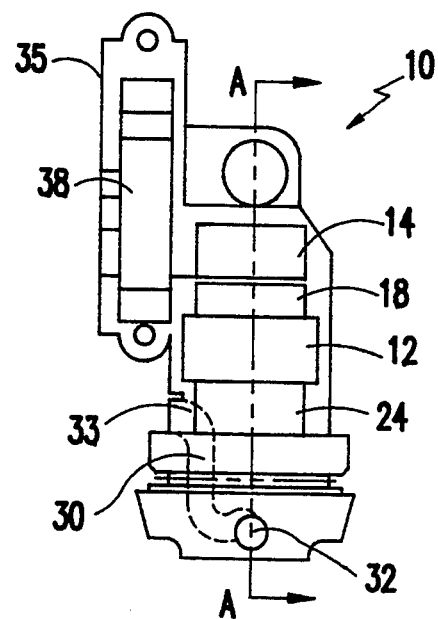
FIG. 1 is a front plan view of a preferred embodiment of the subassembly in accordance with the teachings of this invention.
Figure 2:
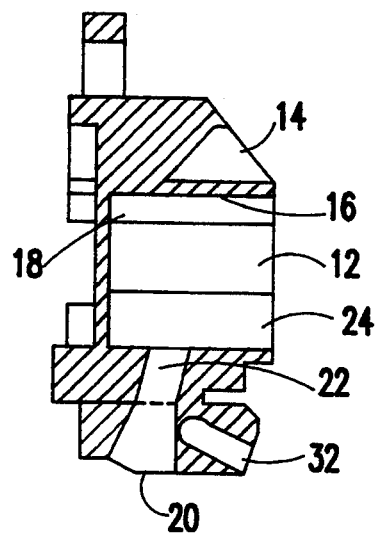
FIG. 2 is a sectional view taken along the line A—A of FIG. 1.
Figure 3:
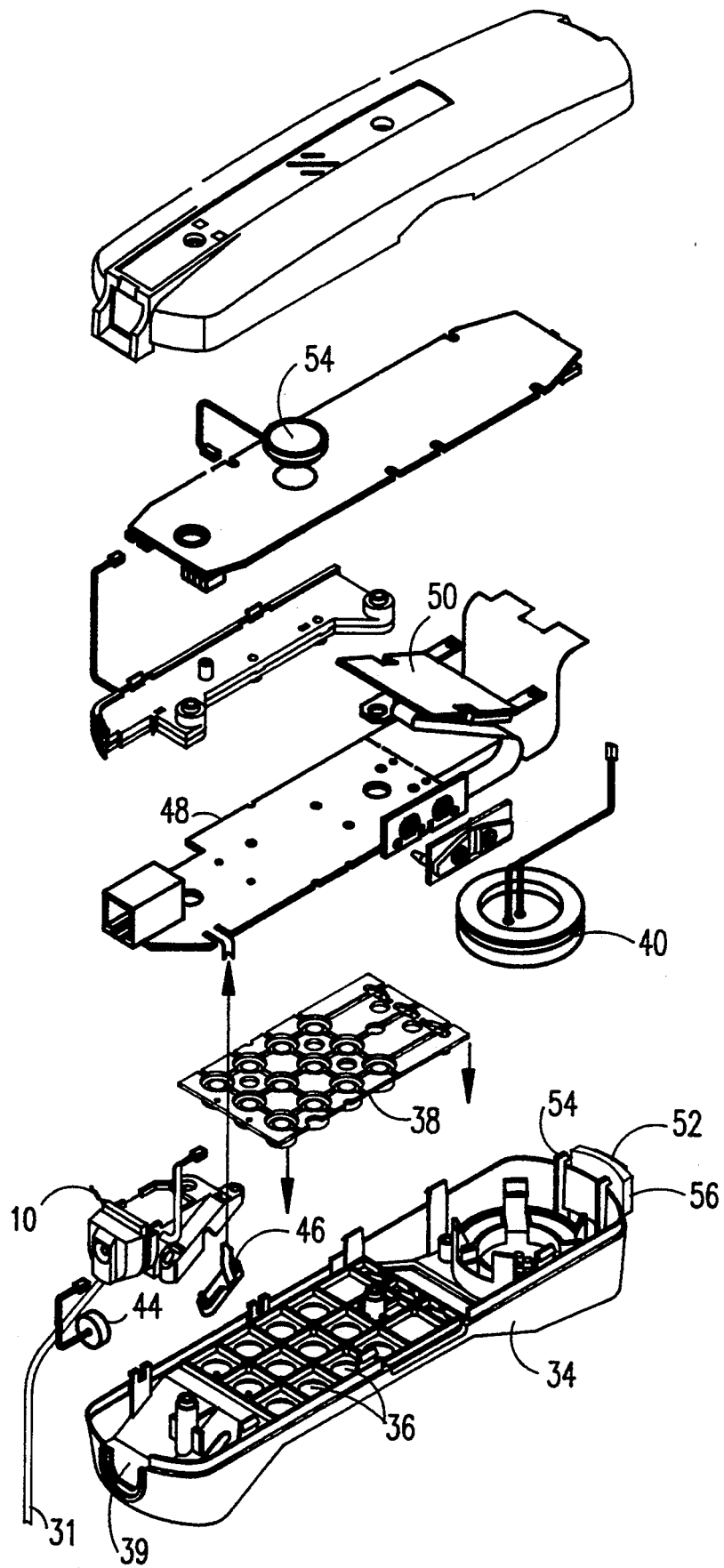
FIG. 3 is an exploded view showing components of the handset.

Referring now to the drawings, with particular reference to FIGS. 1 and 2, the subassembly, indicated by the general reference number 10 in FIG. 1, has a centrally disposed microphone chamber 12 shaped to accept, and house, a commercially available telephone microphone 11 as shown in FIG. 3. A near-field input 14 is located at one end of the subassembly and is connected by a port 16 to near-field acoustic chamber 18 that provides acoustic coupling between the microphone and the port 16. Similarly, a far-field input port 20 is located at the other end of the subassembly, connected by a passageway 22 to a far-field acoustic chamber 24 that provides acoustic coupling between the microphone and the passageway 22. As will be appreciated by those skilled in the art, small passages in the microphone provide a coupling between the near and far-field chambers so that ambient noise, which tends to be equal at the near and far-field inputs, tends to cancel.

An entrance 32 to strain relief passage 30 for the handset cord is located adjacent the far-field input chamber 20. The passage 30 follows a path around passageway 22 that includes several direction changes along three orthogonal axis in order to prevent transmission of a strain on the cord beyond the subassembly. The cord 31 (FIG. 3) enters subassembly through entrance 32 and, following passage 30, process inward toward the passageway 22, turns to one side, turns upward, turns again, and exits the subassembly through opening 33.

A housing 35, for a commercially available reed-hook switch, is an integral part of the assembly. The hook switch (46) fits in the opening 38 in the housing 35.

Referring now to FIG. 3, it shows the installation of the subassembly in a handset in accordance with a preferred embodiment of the invention. The major components of the handset comprise a front housing 34; conveniently a molded piece with openings 36 into which a push-button switch, telephone key-pad array 38 fits, along with mounting brackets for the other components. An elastomeric retainer 52 fits in a bracket 54 in the handset housing.

The subassembly 10, that combines strain relief attachment for the cord, a microphone housing, and hook switch housing, fits in a notch 39 in the front housing 34.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A multi-purpose, one-piece block subassembly for a telephone handset, comprising in combination:

a one-piece block housing with a near-field audio input port at one end of said housing, an interior opening in said housing coupling said near-field audio input port to a near-field acoustic chamber in said housing;

a far-field audio input port at another end of said housing, an interior passage in said housing coupling said far-field audio input port to a far-field acoustic chamber in said housing;

a microphone chamber in said housing disposed between said near-field acoustic chamber and said far-field acoustic chamber; and a passage in said housing for a handset telephone cord, said passage having an inlet adjacent said far-field audio input port and following a path wherein portions of the passage thereof lie in three mutually orthogonal directions through said housing, to an exit from said housing so that said housing absorbs a strain on said handset telephone cord and thereby reduces the transmission of said strain beyond said subassembly.

2. A multi-purpose, one-piece block subassembly for a telephone handset as in claim 1, further including an integrally formed hook switch housing.

3. A multi-purpose, one-piece block subassembly for a telephone handset as in claim 1, wherein said subassembly fits in a notch at one end of a telephone handset housing.

4. A multi-purpose, one-piece block subassembly for a telephone handset as in claim 2, wherein said subassembly fits in a notch at one end of a telephone handset housing.

* * * * *